(12) United States Patent
Tsuji

(10) Patent No.: US 11,780,055 B2
(45) Date of Patent: Oct. 10, 2023

(54) SURFACE TREATMENT METHOD

(71) Applicant: SINTOKOGIO, LTD., Nagoya (JP)

(72) Inventor: Toshiya Tsuji, Nagoya (JP)

(73) Assignee: SINTOKOGIO, LTD., Nagoya (JP)

(*) Notice: Subject to any disclaimer, the term of this patent is extended or adjusted under 35 U.S.C. 154(b) by 0 days.

(21) Appl. No.: 17/685,746

(22) Filed: Mar. 3, 2022

(65) Prior Publication Data
US 2022/0281074 A1 Sep. 8, 2022

(30) Foreign Application Priority Data

Mar. 8, 2021 (JP) ................................ 2021-036443

(51) Int. Cl.
*B24C 11/00* (2006.01)
*B24C 1/08* (2006.01)
*B24C 3/32* (2006.01)

(52) U.S. Cl.
CPC ................ *B24C 11/00* (2013.01); *B24C 1/08* (2013.01); *B24C 3/32* (2013.01)

(58) Field of Classification Search
CPC ................................ B24C 1/08; B24C 1/086
See application file for complete search history.

(56) References Cited

U.S. PATENT DOCUMENTS

| 5,596,912 A | 1/1997 | Laurence et al. |
| 2012/0144890 A1 | 6/2012 | Miyasaka |
| 2015/0184712 A1* | 7/2015 | Kim ...................... B22D 17/00 188/218 XL |
| 2016/0221036 A1 | 8/2016 | Miyasaka |
| 2019/0275639 A1 | 9/2019 | Kibayashi et al. |
| 2020/0361058 A1 | 11/2020 | Taniguchi et al. |

FOREIGN PATENT DOCUMENTS

| CN | 111926340 A | 11/2020 |
| EP | 2 801 443 A1 | 11/2014 |
| JP | 2001-353661 A | 12/2001 |
| JP | 2019-525858 A | 9/2019 |
| KR | 20140001557 A * | 1/2014 |
| WO | WO-2017/215922 A1 | 12/2017 |
| WO | WO-2017/221894 A1 | 12/2017 |

OTHER PUBLICATIONS

Da Rocha, Adabo, Henriques, & Nobilo. (Feb. 17, 2006). Vickers Hardness of Cast Commercially Pure Titanium and Ti-6Al-4V Alloy Submitted to Heat Treatments. Brazil Department of Dental Materials and Prosthodontics, ISSN 0103-6440, 126-129. (Year: 2006).*
CN111926340A Translation Retrieved Feb. 7, 2023, from https://worldwide.espacenet.com/patent/search?q=pn%3DCN111926340A (Year: 2023).*
WO2017221894A1 Translation Retrieved Feb. 7, 2023, from https://worldwide.espacenet.com/patent/search?q=pn%3DWO2017221894A1 (Year: 2023).*

* cited by examiner

*Primary Examiner* — Joel D Crandall
(74) *Attorney, Agent, or Firm* — Faegre Drinker Biddle & Reath LLP

(57) ABSTRACT

A surface treatment method includes: preparing a metal laminated article; and blasting a surface of the metal laminated article using shot media, the shot media include first shot media of first granularity with a grit shape and second shot media of second granularity with a grit shape, and the first granularity is greater than the second granularity.

8 Claims, 5 Drawing Sheets

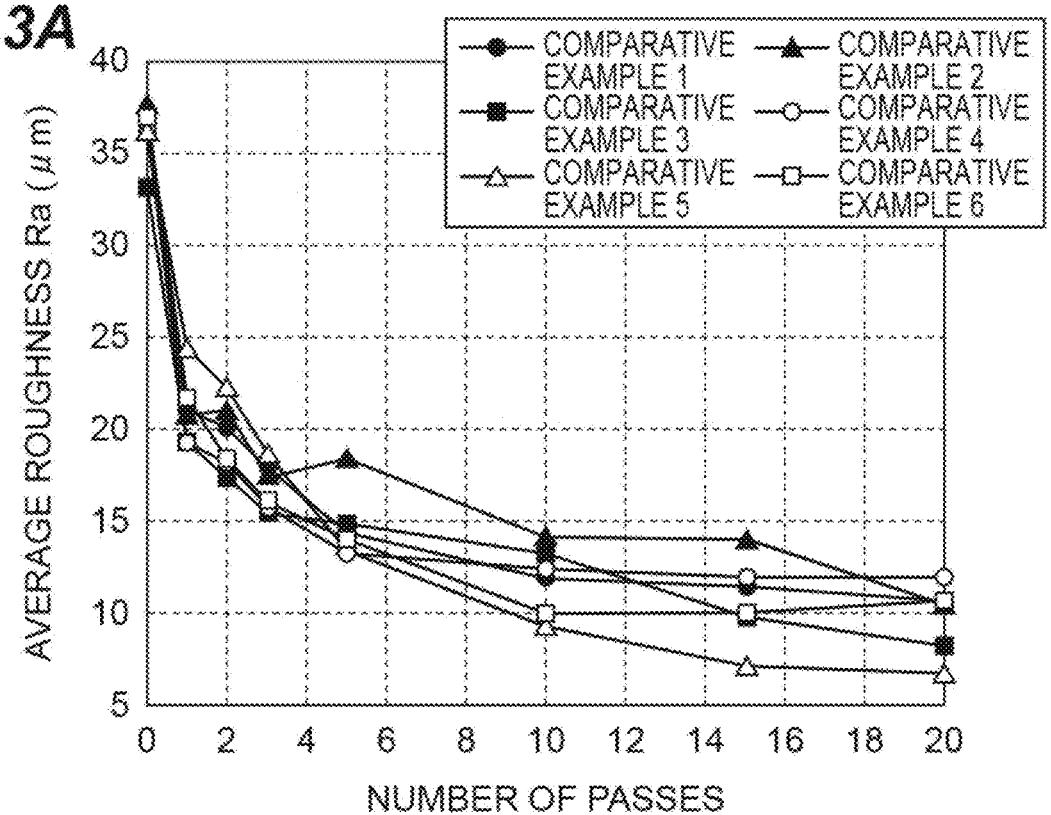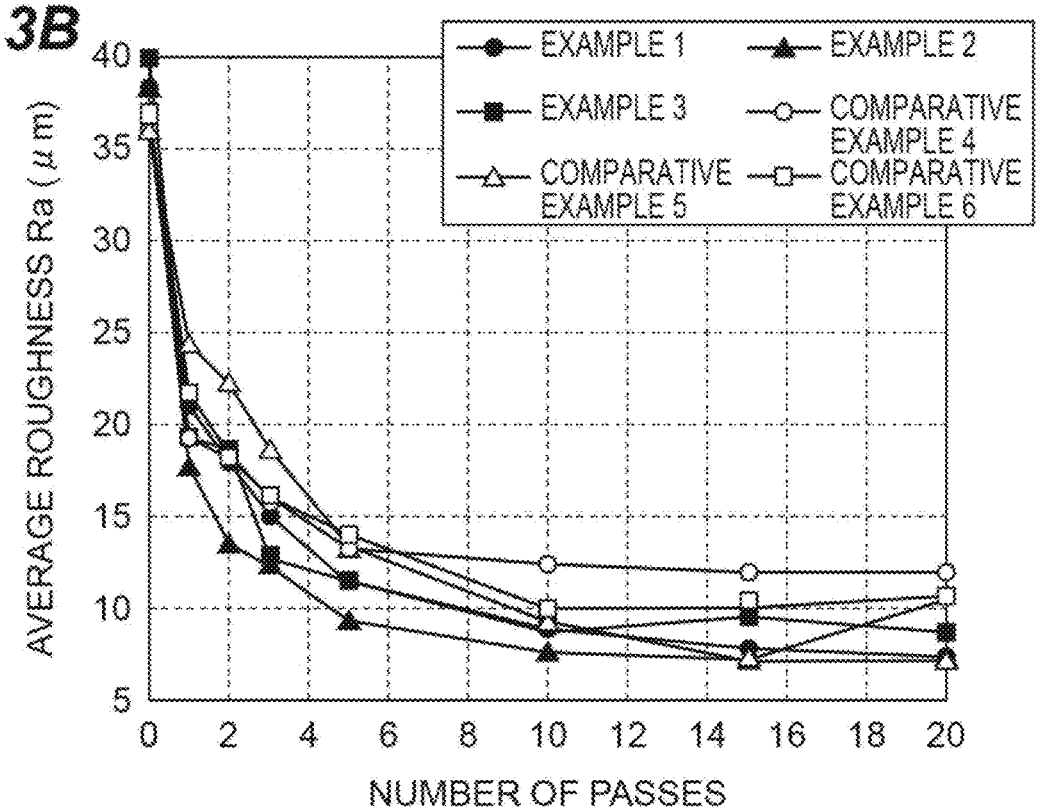

SURFACE TREATMENT METHOD

CROSS-REFERENCE TO RELATED APPLICATIONS

This application is based on and claims the benefit of priority from Japanese Patent Application No. 2021-036443 filed on Mar. 8, 2021, and the entire contents of which are incorporated herein by reference.

TECHNICAL FIELD

The present disclosure relates to a surface treatment method.

BACKGROUND

Japanese Unexamined Patent Publication No. 2019-525858 discloses a method of treating a surface of an additive-manufactured laminated article. According to the method, the surface of the laminated article is smoothed through blasting using shot media with a grit shape.

SUMMARY

Average roughness Ra of a surface of a laminated article manufactured by melting metal powder is about 5 to 50 and surface roughness is significantly high. Therefore, according to the method described in Japanese Unexamined Patent Publication No. 2019-525858, there is a concern that a long treatment time is needed to obtain a sufficiently smoothed surface. The present disclosure provides a technology for efficiently smoothing a surface of a metal laminated article.

A surface treatment method according to an aspect of the present disclosure includes the following steps.
(1) preparing a metal laminated article
(2) blasting a surface of the metal laminated article using shot media Here, the shot media are shot media including first shot media of first granularity with a grit shape and second shot media of second granularity with a grit shape. The first granularity is greater than the second granularity.

The surface of the laminated article manufactured by meting metal powder has roughness formed due to lamination (roughness which is attributable to lamination marks) and roughness formed by the powder material coagulating without being melted (roughness which is attributable to melt-coagulation). The roughness which is attributable to lamination marks tends to be greater than the roughness which is attributable to melt-coagulation. Therefore, the surface of the metal laminated article has a shape in which different types of roughness are present together. In the surface treatment method according to the present disclosure, the first shot media of the first granularity and the second shot media of the second granularity that is smaller than the first granularity is used. In this manner, large roughness which is attributable to the lamination marks is efficiently removed by the first shot media included in the shot media. Moreover, fine roughness which is attributable to the melt-coagulation and treatment marks by the first shot media are removed by the second shot media included in the shot media. In this manner, the surface treatment method according to the present disclosure can more efficiently smooth the surface of the metal laminated article as compared with blasting using only the first shot media or the second shot media.

In one embodiment, Vickers hardness of each of the first shot media and the second shot media may be 1.6 times or more Vickers hardness of the metal laminated article. Also, the first shot media and the second shot media may be formed of the same material. The metal laminated article may be formed of powder of pure titanium and a titanium alloy. According to these methods, it is possible to further efficiently smooth the surface of the metal laminated article.

According to the surface treatment method in the aspect of the present disclosure, it is possible to efficiently smooth the surface of the metal laminated article.

BRIEF DESCRIPTION OF THE DRAWINGS

FIG. 3A is a graph illustrating relationships between the numbers of passes and average roughness of metal laminated articles in surface treatment methods according to comparative examples;

FIG. 3B is a graph illustrating relationships between the numbers of passes and average roughness of metal laminated articles in surface treatment methods according to examples;

DETAILED DESCRIPTION

Hereinafter, various embodiments will be described in detail with reference to the drawings. In each drawing, the same reference signs will be applied to the same or equivalent components.

(Blasting Method)

Figure 1:
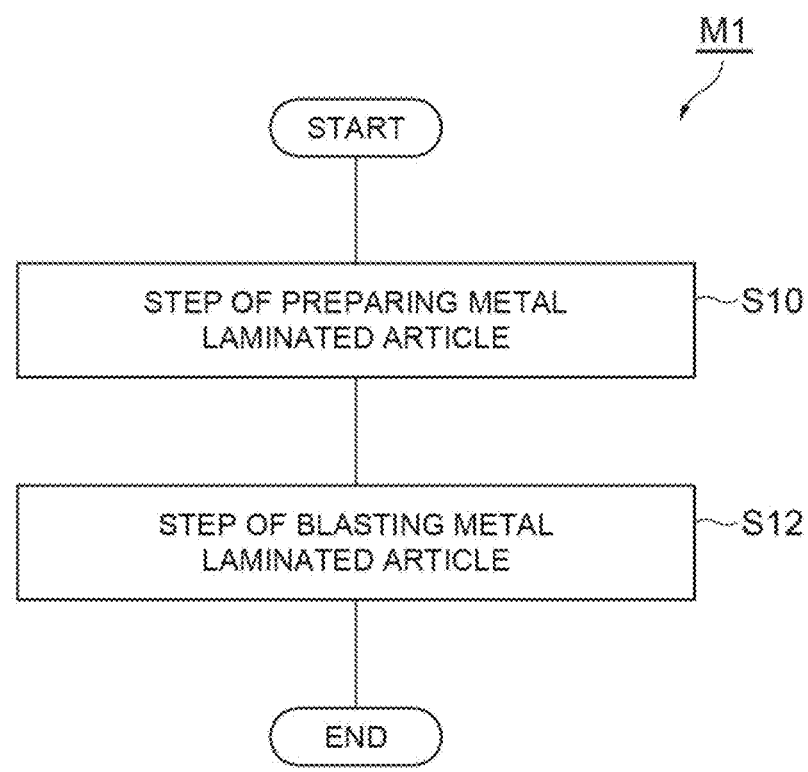
FIG. 1 is a flowchart of a surface treatment method according to an embodiment.

FIG. 1 is a flowchart of a surface treatment method according to an embodiment. A surface treatment method M1 illustrated in FIG. 1 is a method for blasting a metal laminated article. The metal laminated article is obtained by melting metal powder with a laser or the like and shaping each layer.

The material of the metal powder is pure titanium and a titanium alloy in one example. The material of the metal powder may be pure iron and an iron alloy. The iron alloy may include stainless steel and maraging steel. The material of the metal powder may be pure aluminum and an aluminum alloy. The material of the metal powder may be pure copper and a copper alloy. The material of the metal powder may be pure nickel and a nickel alloy. The nickel alloy may include a nickel-based superalloy. The material of the metal powder may be a cobalt alloy. The material of the metal powder may be pure titanium and a titanium alloy. The material of the metal powder may be pure magnesium and a magnesium alloy. The material of the metal powder may be a cemented carbide alloy. The cemented carbide alloy may include tungsten carbide.

Figure 2:
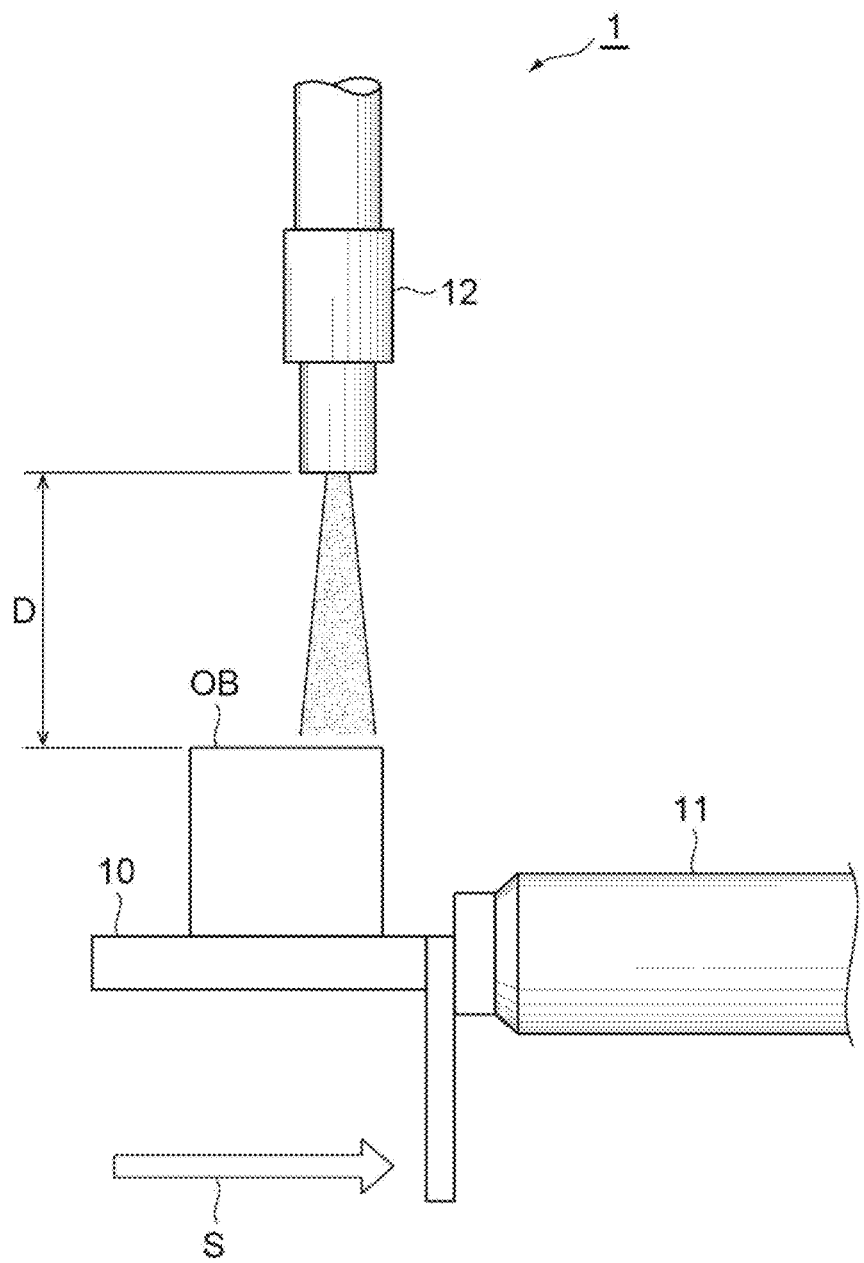
FIG. 2 is an example of a blasting device used in the surface treatment method.

The surface treatment method M1 is realized by a blasting device. FIG. 2 is an example of the blasting device used for the surface treatment method. A blasting device 1 includes a stage 10, a drive device 11, and a nozzle 12. The stage 10 supports a metal laminated article OB. The drive device 11 is connected to the stage 10. The drive device 11 causes the stage 10 to move along a direction S. The drive device 11 is a servo cylinder in one example. The nozzle 12 is secured and disposed to face the stage 10. The nozzle 12 injects the shot media to a surface of the metal laminated article OB on the stage 10 along with air. The nozzle 12 is an air nozzle of a direct pressure type in one example. The blasting device 1 includes a control unit (not illustrated) that controls the amount of driving of the drive device 11 and the amount of injection of the nozzle 12. The control unit can blast a predetermined position on the surface of the metal laminated article OB for a predetermined period of time by controlling the amount of driving of the drive device 11 and the amount of injection of the nozzle 12.

Note that the blasting device used for the surface treatment method M1 is not limited to the blasting device 1 illustrated in FIG. 2. For example, the nozzle 12 may be configured to relatively move with respect to the stage 10. In this case, the blasting device 1 does not have to include the drive device 11. Alternatively, the driving device 11 may be combined with a mechanism for moving the nozzle 12 relative to the stage 10. In this case, for example, the mechanism can move the nozzle 12 in the X direction, and the driving device 11 can move the stage 10 in the Y direction. The nozzle 12 may be an air nozzle of a suction type. The drive device 11 may be a hydraulic cylinder, an air cylinder, or an electric cylinder. Further, the driving device 11 may move the stage 10 in one direction and in a direction orthogonal to the one direction. That is, the driving device 11 may cause the stage 10 to function as a so-called XY stage.

Returning to FIG. 1, the surface treatment method M1 includes a preparing step (Step S10) and a blasting step (Step S12). In the preparing step (Step S10), the metal laminated article OB is placed on the stage 10 of the blasting device 1. Then, in the blasting step (Step S12), the shot media are injected to the metal laminated article OB along with air by the nozzle 12. In this manner, the surface of the metal laminated article OB is blasted.

The shot media used in the blasting step (Step S12) are shot media including first shot media and second shot media. The shot media are obtained by mixing the first shot media and the second shot media in one example. The first shot media and the second shot media have grit shapes. The grit shape means a polygonal shape. The first shot media and the second shot media are formed by crushing shots. Each of the first shot media and the second shot media are steel grit or brown alundum grit in one example. The first shot media and the second shot media may be formed of the same material or may be formed of different materials. In a case in which the first shot media and the second shot media are formed of the same material, quality of the shot media is more easily maintained and its handling becomes easier as compared with a case in which different types of materials are mixed.

The granularity (first granularity) of the first shot media is greater than the granularity (second granularity) of the second shot media. Vickers hardness of each of the first shot media and the second shot media may be 1.6 times or more the Vickers hardness of the metal laminated article OB. In a case in which the Vickers hardness of each of the first shot media and the second shot media is less than 1.6 times the Vickers hardness of the metal laminated article OB, the scraping capacity becomes low, and the shot media cannot sufficiently smooth a target.

Summary of Embodiments

In the surface treatment method M1, the shot media including the first shot media of the first granularity and the second shot media of the second granularity that is smaller than the first granularity is used. In this manner, large roughness on the surface of the metal laminated article OB which is attributable to the lamination marks is efficiently removed by the first shot media included in the shot media. Moreover, fine roughness on the surface of the metal laminated article OB which is attributable to melt-coagulation and treatment marks by the first shot media are removed by the second shot media included in the shot media. In this manner, the surface treatment method according to the present disclosure can more efficiently smooth the surface of the metal laminated article OB as compared with blasting using only the first shot media or the second shot media.

EXAMPLES

[Evaluation of Efficiency of Smoothing]
In order to evaluate the effects of the mixed shot media, the metal laminated article was blasted.
(Preparation of Metal Laminated Article)
First, a metal laminated article that was an object to be treated was manufactured. A manufacturing device was a device (A2X manufactured by Arcam) that emits an electronic beam to melt metal powder for laminate shaping. The metal powder was titanium allow powder ($Ti_6Al-4V$ ELI powder manufactured by Arcam). The metal laminated article was a rectangular parallelepiped with a side of 50 mm. The Vickers hardness was 382 HV.
(Blasting Conditions)
For blasting, the blasting device 1 illustrated in FIG. 2 was used. The pressure of air from the nozzle 12 was 0.3 MPa, and the amount of injection was 13.5 kg/min. The blasting was carried out with the stage 10 caused to move at 3000 mm/min along the direction S.
(Shot Media)

Example 1

Mixed shot media of first shot media and second shot media
First shot media: Steel grit, shot media hardness: 620 HV, granularity: 0.7 mm, hardness ratio (shot media/material to be treated): 1.62
Second shot media: Steel grit, shot media hardness: 620 HV, granularity: 0.3 mm, hardness ratio (shot media/material to be treated): 1.62

Example 2

Mixed shot media of first shot media and second shot media First shot media: Steel grit, shot media hardness: 620 HV, granularity: 0.7 mm, hardness ratio (shot media/material to be treated): 1.62
Second shot media: Steel grit, shot media hardness: 800 HV, granularity: 0.3 mm, hardness ratio (shot media/material to be treated): 2.09

Example 3

Mixed shot media of first shot media and second shot media
First shot media: Steel grit, shot media hardness: 800 HV, granularity: 0.7 mm, hardness ratio (shot media/material to be treated): 2.09
Second shot media: Steel grit, shot media hardness: 800 HV, granularity: 0.3 mm, hardness ratio (shot media/material to be treated): 2.09

Comparative Example 1

Mixed shot media of first shot media and second shot media First shot media: Steel grit, shot media hardness: 620 HV, granularity: 0.7 mm, hardness ratio (shot media/material to be treated): 1.62
Second shot media: Steel grit, shot media hardness: 450 HV, granularity: 0.3 mm, hardness ratio (shot media/material to be treated): 1.18

Comparative Example 2

Mixed shot media of first shot media and second shot media
First shot media: Steel grit, shot media hardness: 450 HV, granularity: 0.7 mm, hardness ratio (shot media/material to be treated): 1.18
Second shot media: Steel grit, shot media hardness: 620 HV, granularity: 0.3 mm, hardness ratio (shot media/material to be treated): 1.62

Comparative Example 3

Mixed shot media of first shot media and second shot media First shot media: Cut wire, shot media hardness: 700 HV, granularity: 0.6 mm, hardness ratio (shot media/material to be treated): 1.83
Second shot media: Steel grit, shot media hardness: 620 HV, granularity: 0.3 mm, hardness ratio (shot media/material to be treated): 1.62

Comparative Example 4

Shot media: Steel grit, shot media hardness: 620 HV, granularity: 0.7 mm, hardness ratio (shot media/material to be treated): 1.62

Comparative Example 5

Shot media: Steel grit, shot media hardness: 800 HV, granularity: 0.3 mm, hardness ratio (shot media/material to be treated): 2.09

Comparative Example 6

Shot media: Cut wire, shot media hardness: 700 HV, granularity: 0.6 mm, hardness ratio (shot media/material to be treated): 1.83
(Surface Roughness Measurement)
When the metal laminated article passed right below the nozzle 12, the count of the number of passes was incremented by one, and the surface of the metal laminated article at that time was measured with a roughness tester. The results are shown in FIG. 3A and FIG. 3B. FIG. 3A is a graph illustrating relationships between the numbers of passes and surface roughness of the metal laminated articles in the surface treatment methods according to comparative examples. The surface roughness is arithmetic mean roughness Ra defined in JIS B0601 which is Japanese Industrial Standards. FIG. 3B is a graph illustrating relationships between the number of passes and the average roughness of the metal laminated articles in the surface treatment methods according to examples. As illustrated in FIG. 3A, the relationships between the numbers of passes and the average roughness in relation to the mixed shot media (Comparative Examples 1 to 3) resulted in such a manner that was substantially similar to typical shot media (Comparative Examples 4 to 6) which were not mixed. On the other hand, it was confirmed that as illustrated in FIG. 3B, the mixed shot media (Examples 1 to 3) were able to reduce average roughness as compared with the typical shot media (Comparative Examples 4 to 6) which were not mixed.

Figure 4A:
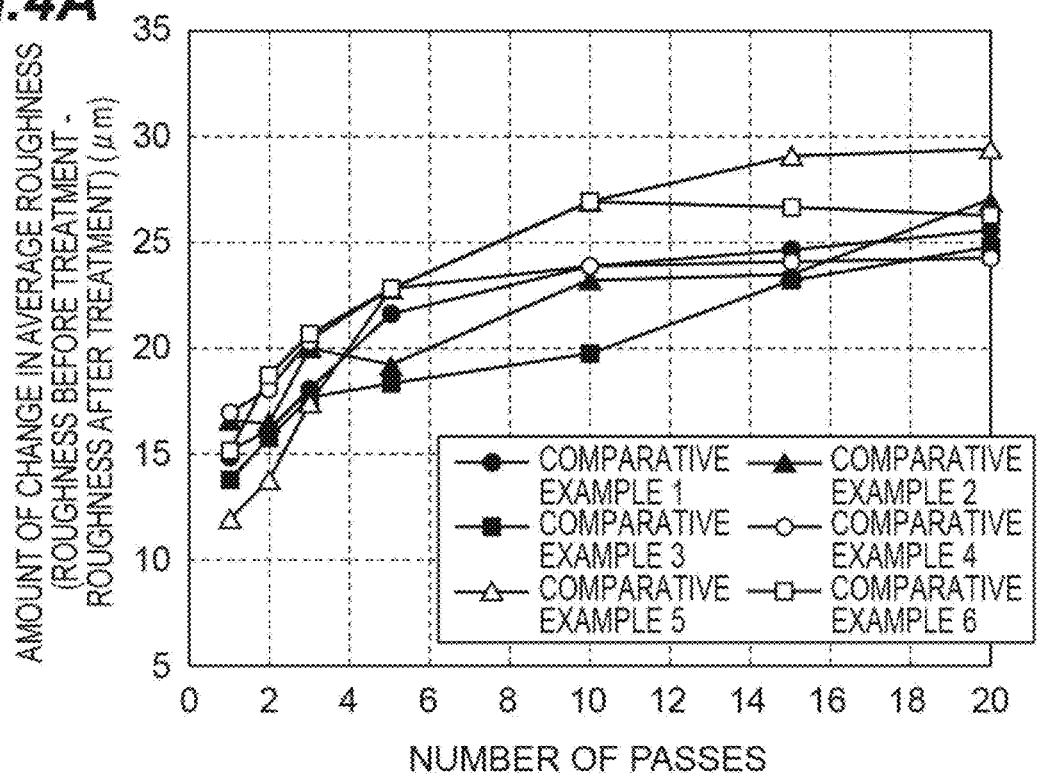
FIG. 4A is a graph illustrating relationships between the numbers of passes and the amounts of change in average roughness of the metal laminated articles in the surface treatment methods according to the comparative examples.
Figure 4B:
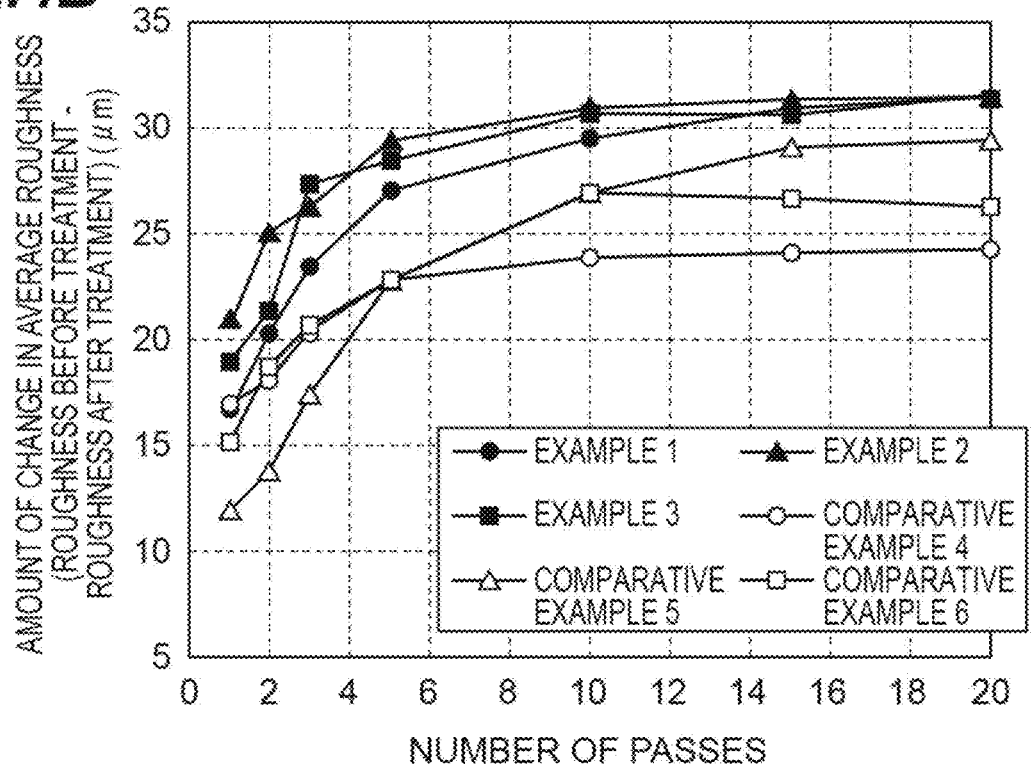
FIG. 4B is a graph illustrating relationships between the numbers of passes and the amounts of change in average roughness of the metal laminated articles in the surface treatment methods according to the examples.

FIG. 4A and FIG. 4B are results of converting the ordinates in FIG. 3A and FIG. 3B into the amounts of change in average roughness. The amounts of change in average roughness were calculated by subtracting average roughness after the treatments from average roughness before the treatments. FIG. 4A is a graph illustrating relationships between the numbers of passes and the amounts of change in average roughness of the metal laminated articles in the surface treatment methods according to the comparative examples. FIG. 4B is a graph illustrating relationships between the number of passes and the amounts of change in average roughness of the metal laminated articles in the surface treatment methods according to the examples. As illustrated in FIG. 4A, the amounts of change in average roughness of the mixed shot media (Comparative Examples 1 to 3) resulted in such a manner that was substantially similar or slightly inferior to the typical shot media (Comparative Examples 4 to 6) which were not mixed. On the other hand, it was confirmed that as illustrated in FIG. 4B, the mixed shot media (Examples 1 to 3) increased the amounts of change in average roughness as compared with the typical shot media (Comparative Examples 4 to 6) which were not mixed. In particular, it was confirmed that the mixed shot media (Examples 1 to 3) were able to realize large amounts of change in average roughness in a stage in which the numbers of passes were small.

As described above, it was confirmed from the measurement results in FIG. 3A, FIG. 3B, FIG. 4A, and FIG. 4B, that efficiency of the blasting was enhanced in a case in which shot media with grit shapes of different granularities were mixed and Vickers hardness of each shot media was 1.6 times or more the Vickers hardness of the metal laminated article.

(Other Materials for Shot Media)
Next, other materials for the shot media were inspected. Metal laminated articles were manufactured by the same methods and conditions as those of the metal laminated articles evaluated in FIG. 3A, FIG. 3B, FIG. 4A, and FIG. 4B.

(Blasting Conditions)
For blasting, the blasting device 1 illustrated in FIG. 2 was used. The pressure of air from the nozzle 12 was 0.2 MPa, the amount of injection was 3.0 kg/min. The blasting was carried out with the stage 10 caused to move at 3000 mm/min along the direction S.

(Shot Media)

Example 4

Mixed shot media of first shot media and second shot media First shot media: Brown alundum grit, shot media hardness: 2100 HV, granularity: 0.500 mm, hardness ratio (shot media/material to be treated): 5.50

Second shot media: Brown alundum grit, shot media hardness: 2100 HV, granularity: 0.125 mm, hardness ratio (shot media/material to be treated): 5.50

Comparative Example 7

Brown alundum grit, shot media hardness: 2100 HV, granularity: 0.500 mm, hardness ratio (shot media/material to be treated): 5.50

Comparative Example 8

Brown alundum grit, shot media hardness: 2100 HV, granularity: 0.125 mm, hardness ratio (shot media/material to be treated): 5.50

(Surface Roughness Measurement)

Figure 5A:
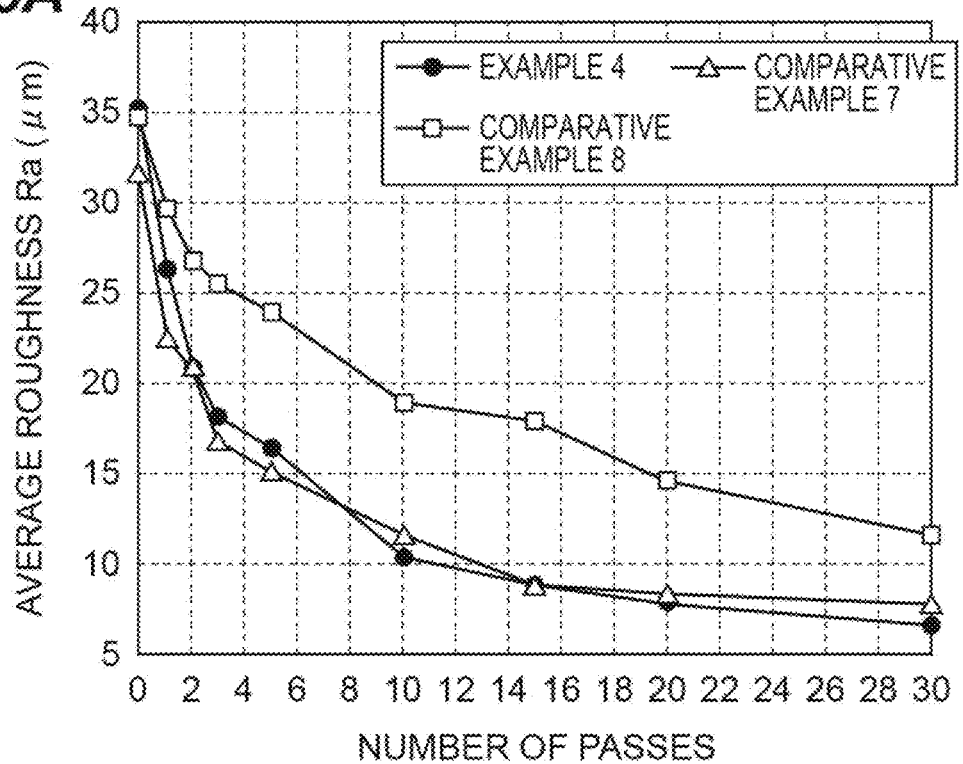
FIG. 5A is another graph illustrating relationships between the numbers of passes and average roughness of the metal laminated articles in the surface treatment methods.
Figure 5B:
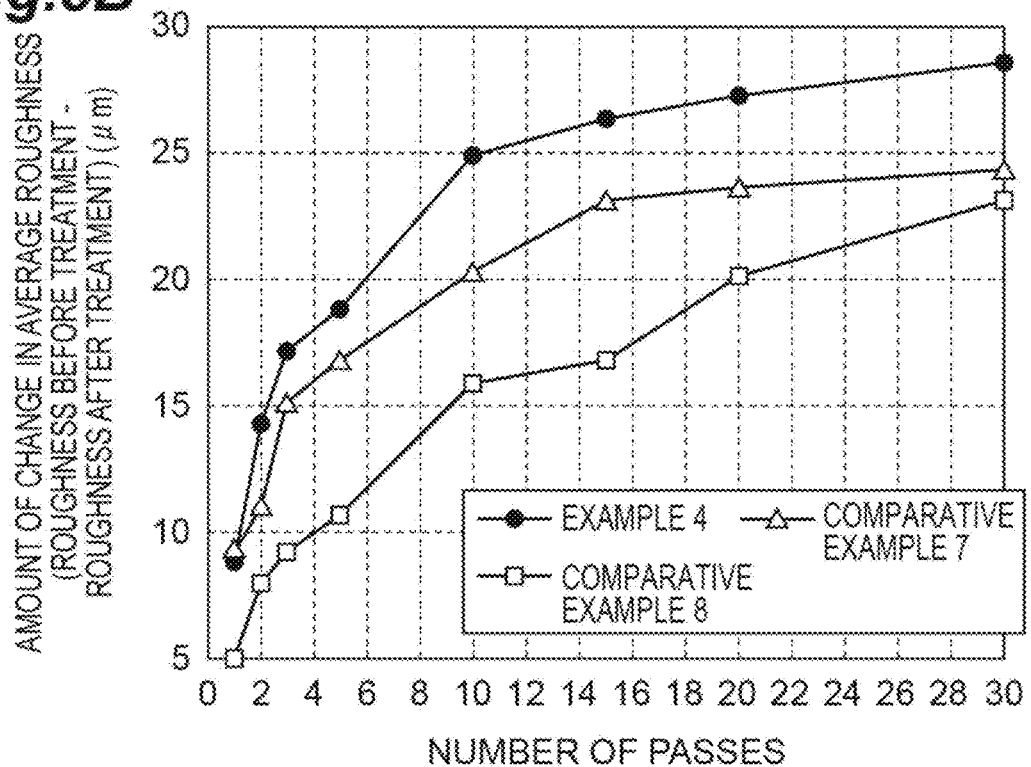
FIG. 5B is another graph illustrating relationships between the numbers of passes and the amounts of change in average roughness of the metal laminated articles in the surface treatment methods.

When the metal laminated article passed right below the nozzle 12, the count of the number of passes was incremented by one, and surface of the metal laminated article at that time was measured with a roughness tester. The results are shown in FIG. 5A and FIG. 5B. FIG. 5A is a graph illustrating relationships between the numbers of passes and average roughness of the metal laminated articles in the surface treatment methods. As illustrated in FIG. 5A, it was confirmed that the mixed shot media (Example 4) was able to reduce the average roughness as compared with the shot media (Comparative Example 8) which was not mixed. On the other hand, the mixed shot media (Example 4) lead to an equivalent result as compared with the shot media (Comparative Example 7) which was not mixed. This may be attributable to variations in surface roughness of the metal laminated articles. On the other hand, FIG. 5B is a result of converting the ordinate in FIG. 5A into the amount of change in average roughness. The amount of change in average roughness was calculated by subtracting average roughness after the treatment from average roughness before the treatment. As illustrated in FIG. 5B, it was confirmed that the mixed shot media (Example 4) increased the amount of change in average roughness as compared with the typical shot media (Comparative Examples 7 and 8) which were not mixed. In particular, it was confirmed that the mixed shot media (Example 4) was able to realize a large amount of change in average roughness in a stage in which the number of passes was small. In this manner, it was confirmed that the same effects as those in a case in which a steel grit was used as shot media were achieved even in a case in which a brown alundum grit was used as shot media.

DESCRIPTION OF SYMBOLS

M1 . . . Surface treatment method, OB . . . Metal laminated article, 1 . . . Blasting device, 10 . . . Stage, 11 . . . Drive device, 12 . . . Nozzle

What is claimed is:

1. A surface treatment method comprising:
preparing a metal laminated article including roughness which is attributable to lamination marks and roughness which is attributable to melt-coagulation; and
blasting a surface of the metal laminated article using shot media, the blasting including removing the roughness which is attributable to lamination marks and the roughness which is attributable to melt-coagulation,
wherein the shot media include first shot media of first granularity with a grit shape and second shot media of second granularity with the grit shape, and the first granularity is greater than the second granularity.

2. The surface treatment method according to claim 1, wherein Vickers hardness of each of the first shot media and the second shot media is 1.6 times or more Vickers hardness of the metal laminated article.

3. The surface treatment method according to claim 1, wherein the first shot media and the second shot media are formed of a same material.

4. The surface treatment method according to claim 2, wherein the first shot media and the second shot media are formed of a same material.

5. The surface treatment method according to claim 1, wherein the metal laminated article is formed of powder of pure titanium and a titanium alloy.

6. The surface treatment method according to claim 2, wherein the metal laminated article is formed of powder of pure titanium and a titanium alloy.

7. The surface treatment method according to claim 3, wherein the metal laminated article is formed of powder of pure titanium and a titanium alloy.

8. The surface treatment method according to claim 4, wherein the metal laminated article is formed of powder of pure titanium and a titanium alloy.

* * * * *